United States Patent
Wang

(10) Patent No.: US 11,283,590 B2
(45) Date of Patent: Mar. 22, 2022

(54) APPARATUS AND METHOD OF CONTROLLING A MULTI-ANTENNA COMMUNICATION SYSTEM

(71) Applicant: Realtek Semiconductor Corp., HsinChu (TW)

(72) Inventor: Lihua Wang, Suzhou (CN)

(73) Assignee: Realtek Semiconductor Corp., HsinChu (TW)

( * ) Notice: Subject to any disclaimer, the term of this patent is extended or adjusted under 35 U.S.C. 154(b) by 0 days.

(21) Appl. No.: 17/160,417

(22) Filed: Jan. 28, 2021

(65) Prior Publication Data
US 2021/0385063 A1    Dec. 9, 2021

(30) Foreign Application Priority Data

Jun. 4, 2020    (CN) .......................... 202010500400.4

(51) Int. Cl.
*H04L 7/04*    (2006.01)
*H04B 7/08*    (2006.01)

(52) U.S. Cl.
CPC ........... *H04L 7/042* (2013.01); *H04B 7/0885* (2013.01)

(58) Field of Classification Search
CPC .............................. H04L 7/042; H04B 7/0885
See application file for complete search history.

(56) References Cited

U.S. PATENT DOCUMENTS

| | | | |
|---|---|---|---|
| 7,206,600 B2 | 4/2007 | Reece | |
| 2010/0041392 A1 | 2/2010 | Hirata | |
| 2013/0084808 A1* | 4/2013 | Zimmermann | H04B 17/309 455/67.11 |
| 2018/0026686 A1* | 1/2018 | Gerdin | H04B 17/12 455/63.4 |
| 2018/0241484 A1 | 8/2018 | Larsson | |
| 2018/0254923 A1* | 9/2018 | Dutz | H04L 7/042 |
| 2019/0242970 A1* | 8/2019 | Silverman | H04B 7/0802 |
| 2020/0267760 A1* | 8/2020 | Bhattad | H04L 5/001 |

FOREIGN PATENT DOCUMENTS

| | | |
|---|---|---|
| CN | 101060354 A | 10/2007 |
| CN | 102970697 A | 3/2013 |
| CN | 104301050 A | 1/2015 |
| WO | 2019/069119 A1 | 4/2019 |

\* cited by examiner

*Primary Examiner* — Dac V Ha
(74) *Attorney, Agent, or Firm* — Winston Hsu

(57) ABSTRACT

A method of controlling a multi-antenna communication system includes: obtaining a first baseband signal through a first antenna; performing a cross-correlation calculation on the first baseband signal and default information during a period of time, thereby to obtain a plurality of cross-correlation calculation results; calculating energy of the first baseband signal to obtain a first energy value; determining connectivity state of the first antenna according to the first energy value and the cross-correlation calculation results; and controlling a signal processing circuit of the multi-antenna communication system according to the connectivity state of the first antenna.

12 Claims, 4 Drawing Sheets

APPARATUS AND METHOD OF CONTROLLING A MULTI-ANTENNA COMMUNICATION SYSTEM

BACKGROUND OF THE INVENTION

1. Field of the Invention

The present invention relates to wireless communication, and more particularly, to a control apparatus and method of determining connection states of antennas and validity of received signals in a multi-antenna wireless communication system.

2. Description of the Prior Art

A multi-antenna wireless communication system relies on multiple discrete antennas to receive and transmit wireless signals, in order to improve the efficiency and reliability of communication. If one or more antennas in the multi-antenna wireless communication system have abnormal connection states, such as, antenna broken, poor contact or not connected, received signals may not be properly used by following baseband processing circuits, which may even affect operations of baseband processing circuits. In light of above, it is necessary to provide a mechanism for detecting connection states of antennas, which can exclude invalid received signals at an early stage of signal reception.

SUMMARY OF THE INVENTION

With this in mind, it is one object of the present invention to provide a control apparatus and method for use in multi-antenna wireless communication system. The present invention determines energy of a received signal. If the energy of the received signal is lower than a predetermined level, the validity of the received signal is further checked in accordance with a cross-correlation calculation result of the received signal and predetermined information. If the received signal is determined to be invalid, a connection state of an antenna that is associated with the received signal will be determined as abnormal, and the received signal will be discarded accordingly. The present invention can determine the connection state of the antenna without requesting a transmitting terminal to send specific calibration signals. Therefore, the performance and reliability of the multi-antenna wireless communication system is significantly improved.

According to one embodiment, a method of controlling a multi-antenna communication system is provided. The method comprises: obtaining a first baseband signal through a first antenna; performing a cross-correlation calculation on the first baseband signal and predetermined information during a period of time, thereby to obtain a plurality of first cross-correlation calculation results; calculating energy of the first baseband signal to obtain a first energy value; determining a connection state of the first antenna according to the first energy value and the first cross-correlation calculation results; and controlling a signal processing circuit of the multi-antenna communication system according to the connection state of the first antenna.

According to one embodiment, a control apparatus for use in a multi-antenna wireless communication system is provided. The control apparatus comprises: a cross-correlation calculation unit, a signal energy calculation unit, a determination unit and control unit. The cross-correlation calculation unit is arranged to perform a cross-correlation calculation on predetermined information and a first baseband signal that is obtained through a first antenna during a period of time, thereby to obtain a plurality of first cross-correlation calculation results. The signal energy calculation unit is coupled to the cross-correlation calculation unit and arranged to calculate energy of the first baseband signal to obtain a first energy value. The determination unit is coupled to the cross-correlation calculation unit and arranged to determine a connection state of the first antenna according to the first energy value and the first cross-correlation calculation results. The control unit is coupled to the determination unit, and arranged to control a signal processing circuit of the multi-antenna communication system according to the connection state of the first antenna.

These and other objectives of the present invention will no doubt become obvious to those of ordinary skill in the art after reading the following detailed description of the preferred embodiment that is illustrated in the various figures and drawings.

DETAILED DESCRIPTION

In the following description, numerous specific details are set forth in order to provide a thorough understanding of the present embodiments. It will be apparent, however, to one having ordinary skill in the art that the specific detail need not be employed to practice the present embodiments. In other instances, well-known materials or methods have not been described in detail in order to avoid obscuring the present embodiments.

Reference throughout this specification to "one embodiment" or "an embodiment" means that a particular feature, structure or characteristic described in connection with the embodiment or example is included in at least one embodiment of the present embodiments. Thus, appearances of the phrases "in one embodiment" or "in an embodiment" in various places throughout this specification are not necessarily all referring to the same embodiment. Furthermore, the particular features, structures or characteristics may be combined in any suitable combinations and/or sub-combinations in one or more embodiments.

Figure 1:
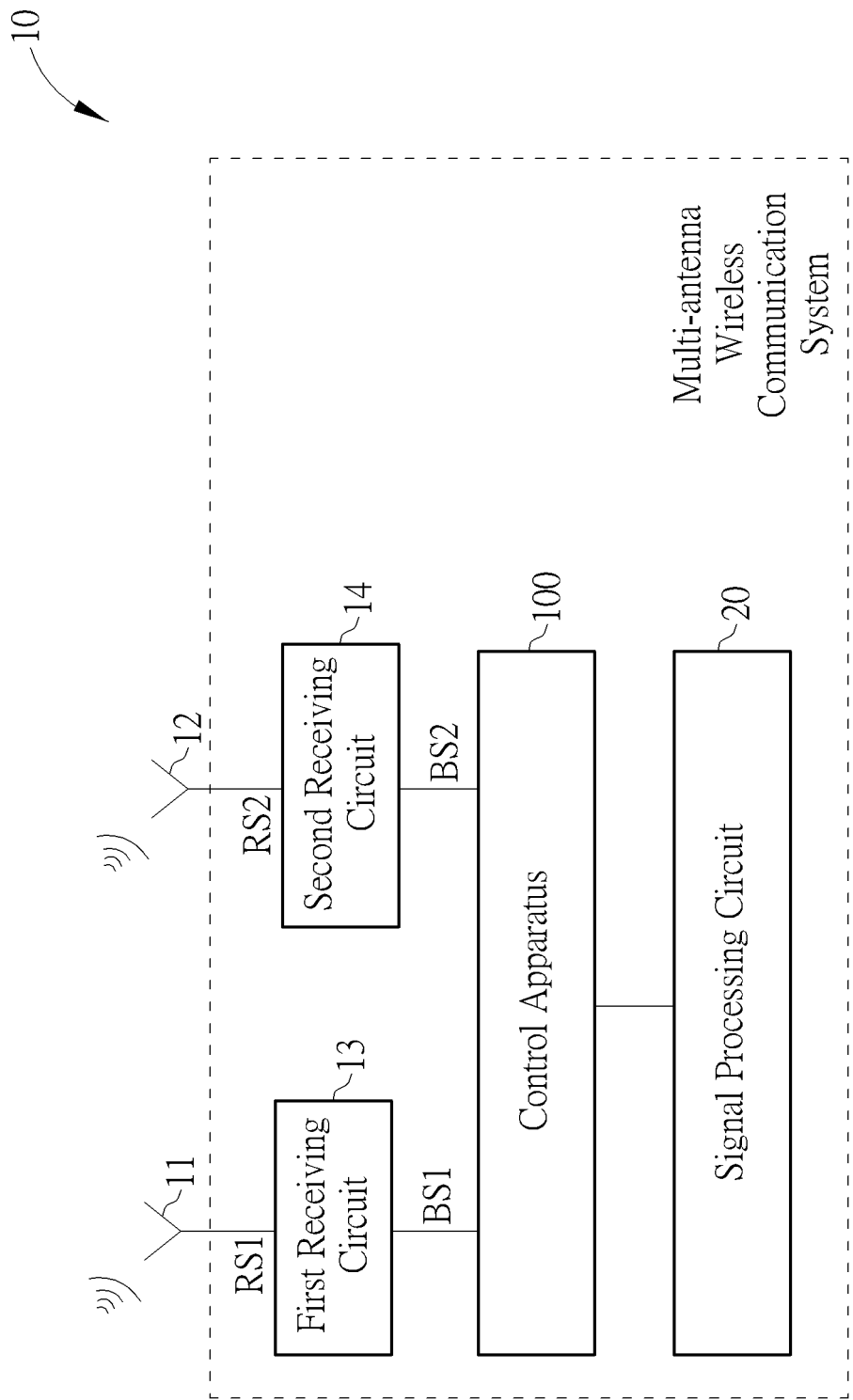
FIG. 1 illustrates an application of a control apparatus according to one embodiment of the present invention.

Please refer to FIG. 1, which illustrates an application of a control apparatus according to one embodiment of the present invention. As illustrated, a control apparatus 100 of the present invention is applied to a multi-antenna wireless communication system 10, where the multi-antenna wireless communication system 10 could be a communication device that conforms to the IEEE 802.11b wireless communication protocol. However, this is not a limitation in applications of the control apparatus 100 and related method of the present invention. According to various embodiment of the present invention, the multi-antenna wireless communication system 10 could be a wireless communication device based on other communication protocols. The multi-antenna wireless communication system 10 comprises at least first antenna 11 and second antenna 12. The first antenna 11 and the second antenna 12 intercepts radio waves, thereby to obtain a first radio-frequency signal RS1 and a second radio-frequency signal RS2. The multi-antenna wireless communication system 10 also comprises a first receiving circuit 13 and a second receiving circuit 14. The receiving circuit 13 and the second receiving circuit 14 can convert the first radio-frequency signal RS1 and the second radio-frequency signal RS2 to a first baseband signal BS1 and a second baseband signal BS2, respectively. In one embodiment, the receiving circuit 13 and the second receiving circuit 14 could comprise various components, like couplers, frequency down-conversion circuits, filters, and analog-to-digital converters that are necessary to convert radio-frequency signals to baseband signals. The control apparatus 100 of the present invention could determine individual connection states the first antenna 11 and the second antenna 12 according to the first baseband signal BS1 and the second baseband signal BS2. According to the connection states of the antennas, the control apparatus 100 could further control how a signal processing circuit 20 in the multi-antenna wireless communication system 10 processes the first baseband signal BS1 and the second baseband signal BS2. In one embodiment, once the control apparatus 100 determines the connection state of the antenna is abnormal (e.g. antenna broken, poor contacts or not connected), the control apparatus 100 instructs the signal processing circuit 20 to discard the baseband signals that are obtained from the abnormal antenna. The signal processing circuit 20 could be a baseband processing circuit in the multi-antenna wireless communication system 10.

Figure 2:
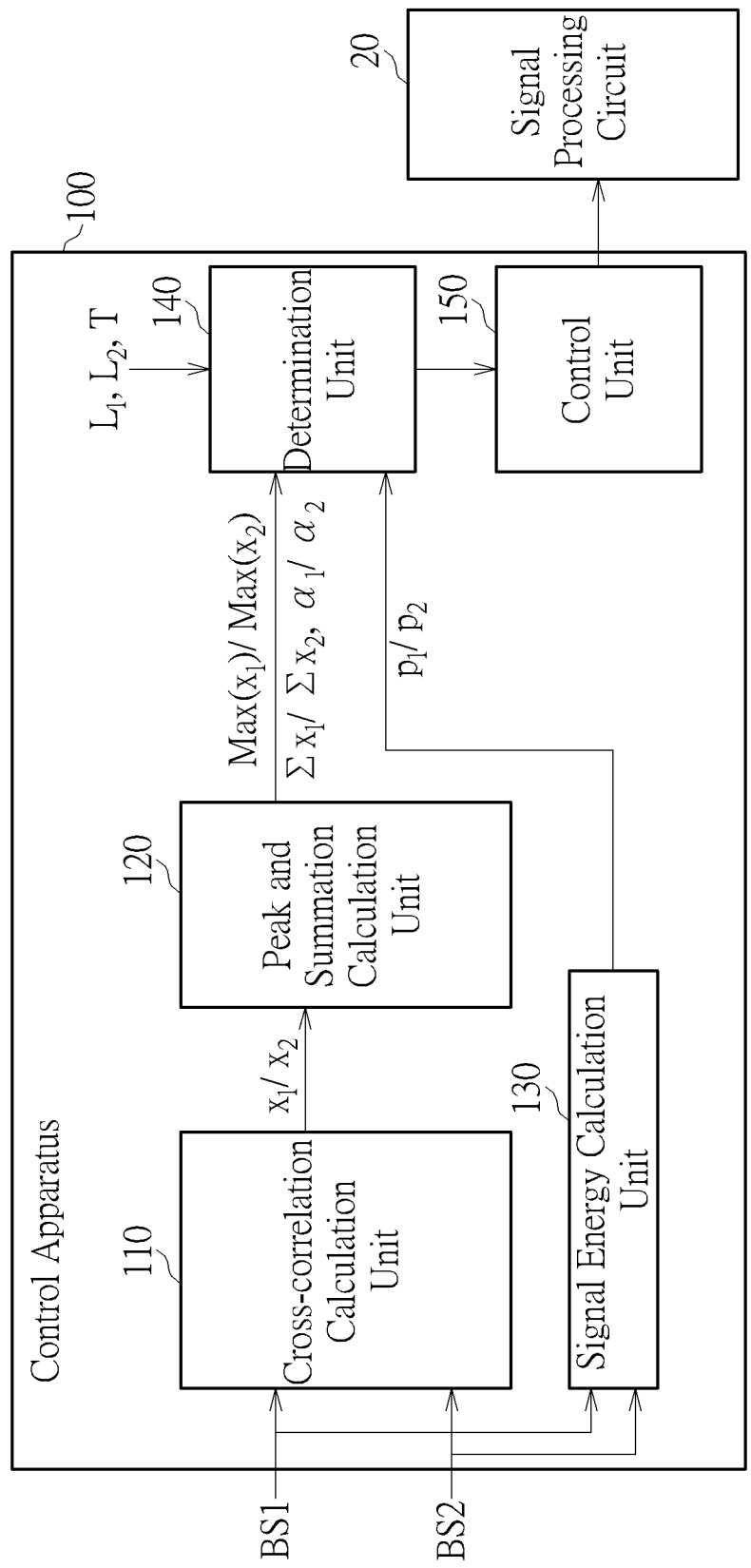
FIG. 2 illustrates a schematic diagram of the control apparatus according to one embodiment of the present invention.
Figure 3:
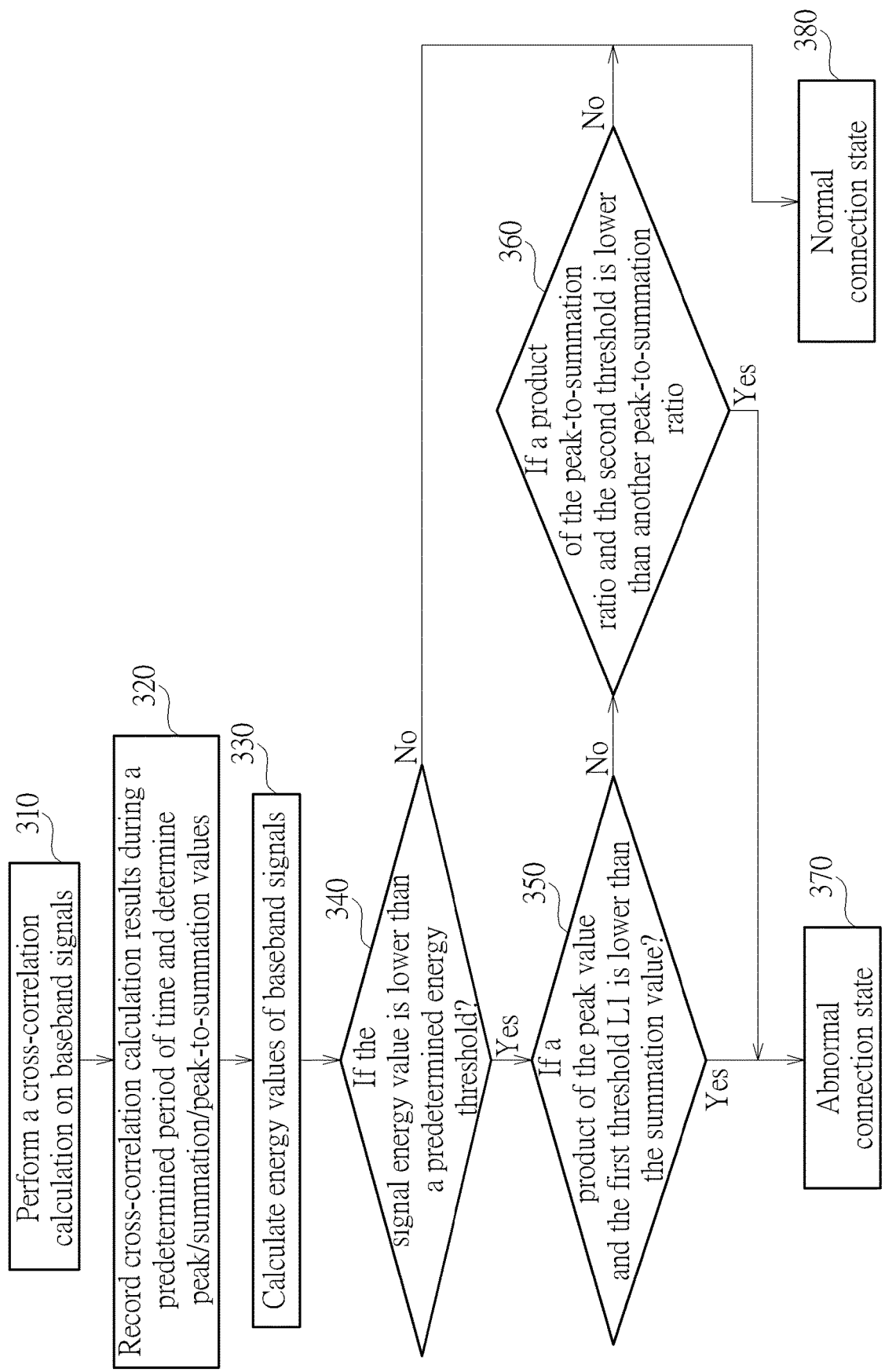
FIG. 3 illustrates a flow chart of a method according to one embodiment of the present invention.

FIG. 2 illustrates a schematic diagram of a control apparatus according to one embodiment of the present invention. As illustrated, the control apparatus 100 comprises a cross-correlation calculation unit 110, a peak and summation calculation unit 120, a signal energy calculation unit 130, a determination unit 140 and a control unit 150. In the following, actual operations of each unit will be explained by equations in conjunction with the flow chart in FIG. 3.

First, assume that the first baseband signal BS1 is $s_1$ and the second baseband signal BS2 is $s_2$. At step 310, the cross-correlation calculation unit 110 will perform cross-correlation calculations on a known local data sequence and the first baseband signal BS1/the second baseband signal BS2, respectively. In a preferred embodiment, the known local data sequence has a feature identical/similar to a pattern of a specific head of frame (e.g. header) that is employed for synchronization in the multi-antenna communication system. Cross-correlation calculations performed by the cross-correlation calculation unit 110 include: multiplying the first baseband signal BS1 by predetermined information c (i.e., the known local data sequence) and multiplying the second baseband signal BS2 by the predetermined information c and taking absolute values of theses multiplication results. Accordingly, the cross-correlation calculation unit 110 obtains first cross-correlation calculation results $x_1$ from the cross-correlation calculation with respect to the first baseband signal BS1 and obtains second cross-correlation calculation results $x_2$ from the cross-correlation calculation with respect to the second baseband signal BS2. The first cross-correlation calculation results $x_1$ and the second cross-correlation calculation results $x_2$ can be represented as follows:

$$x_1 = |s_1 c|$$

$$x_2 = |s_2 c|$$

Accordingly, in step 320, the peak and summation calculation unit 120 records first cross-correlation calculation results $x_1$ and the second cross-correlation calculation results $x_2$ during a predetermined period of time and determines peak values $Max(x_1)$ and $Max(x_2)$, summation values $\Sigma x_1$ and $\Sigma x_2$ and peal-to-summation ratios $\alpha_1$ and $\alpha_2$ regarding the cross-correlation calculation results during the predetermined period of time:

$$\alpha_1 = \frac{Max(x_1)}{\Sigma x_1}$$

$$\alpha_2 = \frac{Max(x_2)}{\Sigma x_2}$$

wherein the first peak value $Max(x_1)$ and the second peak value $Max(x_2)$ are maximum values of the first cross-correlation calculation results $x_1$ and the second cross-correlation calculation results $x_2$ during the predetermined period of time, respectively. If the baseband signal is a valid signal, it must include the above-mentioned specific head of frame and will be similar to the predetermined information c. Therefore, the cross-correlation calculation results should have a peak values. Moreover, the first summation value $\Sigma x_1$ represent a summation of the first cross-correlation calculation results $x_1$, while the second summation value $\Sigma x_2$ represent a summation of the second cross-correlation calculation results $x_2$ during the predetermined period of time. The peal-to-summation ratios $\alpha_1$ is a ratio of the first peak value $Max(x_1)$ to the first summation value $\Sigma x_1$, while the peal-to-summation ratios $\alpha_2$ is a ratio of the second peak value $Max(x_2)$ to the second summation value $\Sigma x_2$. In a preferred embodiment, the predetermined period of time is identical to duration of a symbol in the multi-antenna wireless communication system 10.

At step 330, the signal energy calculation unit 130 calculates signal energy values $p_1$ and $p_2$ of the first baseband signal BS1 and the second baseband signal BS2:

$$p_1 = 10 \times \log_{10}\left(\frac{|x_1|^2}{50}\right) + 30$$

$$p_2 = 10 \times \log_{10}\left(\frac{|x_2|^2}{50}\right) + 30$$

According to statistical data of the cross-correlation calculation results $x_1$ and $x_2$ recorded by the peak and summation calculation unit 120, as well as the signal energy values $p_1$ and $p_2$ calculated by the signal energy calculation unit 130, the determination unit 140 could determine the connection state of the antennas. At step 340, it is determined whether the signal energy value p is lower than a predetermined energy threshold T. In one embodiment, the predetermined energy threshold T may be between −95 dBm and −85 dBm. However, the range of the predetermined energy threshold T may vary with a communication protocol used in the multi-antenna wireless communication system 10. If the signal energy value of a baseband signal obtained from a certain antenna is lower than the predetermined energy threshold T, meaning that the energy of the baseband signal is weak, the flow goes to step 350. As step 350, the determination unit 140 determines whether the connect state of the antenna is abnormal based on the peak values Max(x) and summation values $\Sigma$x obtained from the cross-correlation calculation results. Comparisons executed in steps 340 and 350 can be represented in the following equations. If the signal energy value $p_1$ of the baseband signal BS1 obtained through the first antenna 11 is lower than the predetermined energy threshold T:

$$p_1 < T$$

At this time, the determination unit 140 determines whether the following condition is met:

$$\text{Max}(x_1) \times L_1 < \Sigma x_1$$

The peak value $\text{Max}(x_1)$ of the cross-correlation calculation results $x_1$ is multiplied by a first threshold $L_1$. In one embodiment, the first threshold $L_1$ may be between 3 and 30. However, the range of the first threshold $L_1$ may vary with a communication protocol used in the multi-antenna wireless communication system 10. If a product of the peak value $\text{Max}(x_1)$ and the first threshold $L_1$ is lower than the summation value $\Sigma x_1$ of the first cross-correlation calculation results $x_1$, the determination unit 140 determines the current connection state of the first antenna 11 is abnormal (step 370). If not, it is determined that the current connection state of the first antenna 11 is normal (step 380).

In another embodiment, to improve the accuracy of determining the connection state, the first cross-correlation calculation results $x_1$ with respect to the first baseband signal BS1 will be compared with the second cross-correlation calculation results $x_2$ with respect to the second baseband signal BS2. Accordingly, the flow goes to step 360, where the determination unit 140 determines whether the following condition is met:

$$\alpha_1 \times L_2 < \alpha_2$$

The peak-to-summation ratio $\alpha_1$ of the cross-correlation calculation results $x_1$ will be multiplied by a second threshold $L_2$, where the second threshold $L_2$ may be between 2 and 10. However, the range of the second threshold $L_2$ may vary with a communication protocol used in the multi-antenna wireless communication system 10. If a product of the peak-to-summation ratio $\alpha_1$ of the first cross-correlation calculation results $x_1$ and the second threshold $L_2$ is lower than the peak-to-summation ratio $\alpha_2$ of the second cross-correlation calculation results $x_2$, the determination unit 140 determines the connection state of the first antenna 11 is abnormal (step 370). If not, the connection state of the first antenna 11 will be determined as normal (step 380). According to the determination of the connection states of the antennas, the control unit 150 will instruct the signal processing circuit 20 either to conserve the baseband signals BS1 and BS2 or discard them. If the antenna has an abnormal connection state, the corresponding baseband signal will be discarded.

Please note that, even though only baseband signals BS1 and BS2 are described in the above embodiments for determining the connection states of the antennas 11 and 12, this is not intended to limit the present invention in scope. In addition to dual-antenna wireless communication system, the present invention could be also applied to multi-antenna wireless communication system. It can be understood from step 310 to step 350, the present invention can determine whether the connection state of an antenna is normal simply by analyzing the baseband signal received from this antenna. Thus, the flow from step 310 to step 350 can apply to the wireless commutation system with any given number of antennas. Only after the flow goes to step 360, it needs to compare the cross-correlation calculation results of the baseband signals received by one antenna with another antenna. However, this can also be achieved by having a pairwise comparison on the cross-correlation calculation results of the baseband signals to determine connection states of any given number of antennas. In addition to the method described above, another approach to detect connection states of any given number of antennas is to compare a highest cross-correlation calculation result of an antenna with cross-correlation calculation results of other antennas, thereby to determine the connection state of each antenna.

Figure 4:
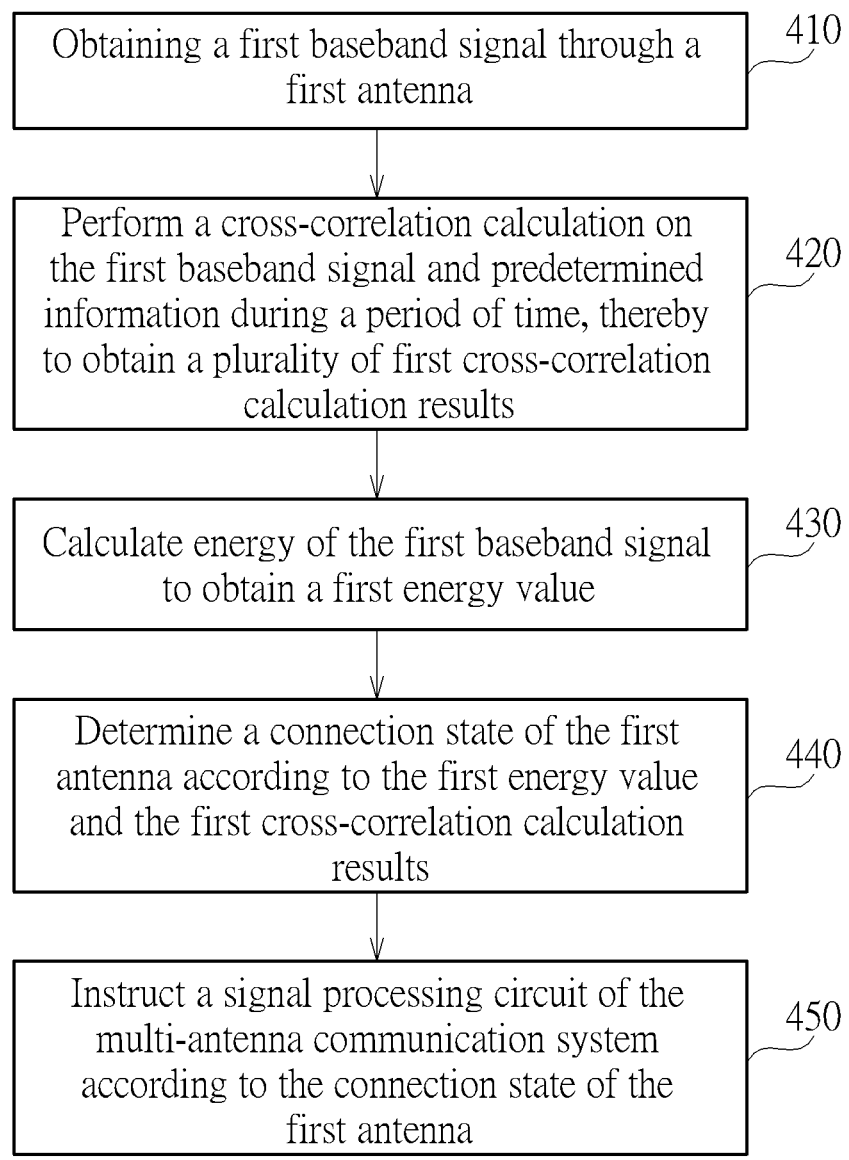
FIG. 4 illustrates a simplified flow chart of the method according to one embodiment of the present invention.

FIG. 4 illustrates a simplified flow chart of the method according to one embodiment of the present invention. The flow comprises the following step:

Step 410: obtaining a first baseband signal through a first antenna;

Step 420: performing a cross-correlation calculation on the first baseband signal and predetermined information during a period of time, thereby to obtain a plurality of first cross-correlation calculation results;

Step 430: calculating energy of the first baseband signal to obtain a first energy value;

Step 440: determining a connection state of the first antenna according to the first energy value and the first cross-correlation calculation results; and Step 450: Instructing a signal processing circuit of the multi-antenna communication system according to the connection state of the first antenna In some embodiments, step 440 further comprise: if the first energy value is lower than a predetermined energy threshold and a product of a first peak value and a first threshold is lower than a first summation value, determining the connection state of the first antenna is abnormal; and/or if a product of the first peak value and the first threshold is higher than the first summation value, as well as a product a first peak-to-summation ratio and a second threshold is lower than a second peak-to-summation ratio, determining the connection state of the first antenna is abnormal. As details of the above-mentioned steps have been explained in the embodiment illustrated by FIG. 3, further descriptions are omitted here for the sake of brevity.

In conclusion, the present invention determines the energy of the received baseband signal. When the energy of the received baseband signal is lower than a predetermined energy threshold, the validity of the received baseband signal is further checked based on the cross-correlation calculation result of the received baseband signal and the predetermined information. Moreover, when the received baseband signal is determined as invalid, it can be determined that the connection state of the antenna corresponding to the received baseband signal is abnormal. Accordingly the received signal will be therefore discarded. The present invention does not request the transmitting end to send specific calibration signals, but the connection state of the antenna can be still determined. Therefore, the performance and reliability of the multi-antenna wireless communication system can be significantly improved.

Embodiments in accordance with the present invention can be implemented as an apparatus, method, or computer program product. Accordingly, the present embodiments may take the form of an entirely hardware embodiment, an entirely software embodiment, or an embodiment combining software and hardware aspects that can all generally be referred to herein as a "module" or "system." Furthermore, the present embodiments may take the form of a computer program product embodied in any tangible medium of expression having computer-usable program code embodied in the medium. In terms of hardware, the present invention can be accomplished by applying any of the following technologies or related combinations: an individual operation logic with logic gates capable of performing logic functions according to data signals, and an application specific integrated circuit (ASIC), a programmable gate array (PGA) or a field programmable gate array (FPGA) with a suitable combinational The flowchart and block diagrams in the flow diagrams illustrate the architecture, functionality, and operation of possible implementations of systems, methods, and computer program products according to various embodiments of the present embodiments. In this regard, each block in the flowchart or block diagrams may represent a module, segment, or portion of code, which comprises one or more executable instructions for implementing the specified logical function(s). It is also noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions. These computer program instructions can be stored in a computer-readable medium that directs a computer or other programmable data processing apparatus to function in a particular manner, such that the instructions stored in the computer-readable medium produce an article of manufacture including instruction means which implement the function/act specified in the flowchart and/or block diagram block or blocks.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of controlling a multi-antenna communication system, comprising:
    obtaining a first baseband signal through a first antenna;
    performing a cross-correlation calculation on the first baseband signal and predetermined information during a period of time, thereby to obtain a plurality of first cross-correlation calculation results;
    calculating energy of the first baseband signal to obtain a first energy value;
    determining a connection state of the first antenna according to the first energy value and the first cross-correlation calculation results, comprising:
    determining a first peak value corresponding to a maximum one from the first cross-correlation calculation results;
    determining a first summation value corresponding to a summation of the first cross-correlation calculation results; and
    determining the connection state of the first antenna is abnormal if the first energy value is smaller than a predetermined energy threshold, and a product of the first peak value and a first threshold is lower than the first summation value; and
    instructing a signal processing circuit of the multi-antenna communication system according to the connection state of the first antenna.

2. The method of claim 1, wherein the predetermined information has a feature identical to a pattern of a specific head of frame that is employed for synchronization in the multi-antenna communication system.

3. The method of claim 1, wherein the step of determining the connection state of the first antenna comprises:

determining the connection state of the first antenna further according to a second baseband signal obtained from a second antenna if the first energy value is lower than the predetermined energy threshold and a product of the first peak value and the first threshold is higher than the first summation value.

4. The method of claim 3, further comprising:
    performing the cross-correlation calculation on the second baseband signal and the predetermined information during the period of time, thereby to obtain a plurality of second cross-correlation calculation results; and
    calculating energy of the second baseband signal to obtain a second energy value.

5. The method of claim 4, wherein the step of determining the connection state of the first antenna comprises:
    determining a second peak value corresponding a maximum one from the second cross-correlation calculation results;
    determining a second summation value corresponding to a summation of the second cross-correlation calculation results; and
    determining a first peak-to-summation ratio according to the first peak value and the first summation value;
    determining a second peak-to-summation ratio according to the second peak value and the second summation value;
    determining the connection state of the first antenna is abnormal if a product of the first peak-to-summation ratio and a second threshold is lower than the second peak-to-summation ratio.

6. The method of claim 1, wherein the step of controlling the signal processing circuit according to the connection state of the first antenna comprises: instructing the signal processing circuit to discard the first baseband signal if the connection state of the first antenna is abnormal.

7. A control apparatus for use in a multi-antenna communication system, comprising:
    a cross-correlation calculation unit, arranged to perform a cross-correlation calculation on predetermined information and a first baseband signal that is obtained through a first antenna during a period of time, thereby to obtain a plurality of first cross-correlation calculation results;
    a signal energy calculation unit, coupled to the cross-correlation calculation unit, arranged to calculate energy of the first baseband signal to obtain a first energy value;
    a determination unit, coupled to the cross-correlation calculation unit, arranged to determine a connection state of the first antenna according to the first energy value and the first cross-correlation calculation results;
    a control unit, coupled to the determination unit, arranged to instruct a signal processing circuit of the multi-antenna communication system according to the connection state of the first antenna; and
    a peak and summation calculation unit, coupled to the cross-correlation calculation unit, arranged to determine a first peak value corresponding to a maximum one from the first cross-correlation calculation results and arranged to determine a first summation value of a summation of the first cross-correlation calculation results, wherein the determination unit determines the connection state of the first antenna is abnormal if the first energy value is lower than a predetermined energy threshold, and a product of the first peak value and a first threshold is lower than the first summation value.

8. The control apparatus of claim 7, wherein the predetermined information has a feature identical to a pattern of a specific head of frame that is employed for synchronization in the multi-antenna communication system.

9. The control apparatus of claim 7, wherein the determination unit determines the connection state of the first antenna further according to a second baseband signal obtained from a second antenna if the first energy value is lower than the predetermined energy threshold and a product of the first peak value and the first threshold is higher than the first summation value.

10. The control apparatus of claim 9, wherein the cross-correlation calculation unit is further arranged to perform the cross-correlation calculation on the second baseband signal and the predetermined information during the period of time, thereby to obtain a plurality of second cross-correlation calculation results and calculate energy of the second baseband signal to obtain a second energy value.

11. The control apparatus of claim 10, wherein the peak and summation calculation unit is arranged to determine a second peak value corresponding a maximum one from the second cross-correlation calculation results, determine a second summation value corresponding to a summation of the second cross-correlation calculation results, determine a first peak-to-summation ratio according to the first peak value and the first summation value and determine a second peak-to-summation ratio according to the second peak value and the second summation value; wherein the determination unit determines the connection state of the first antenna is abnormal if a product of the first peak-to-summation ratio and a second threshold is lower than the second peak-to-summation ratio.

12. The control apparatus of claim 7, wherein the control unit instructs the signal processing circuit to discard the first baseband signal if the determination unit determines connection state of the first antenna is abnormal.

* * * * *